(12) United States Patent
Riedl

(10) Patent No.: US 7,055,068 B2
(45) Date of Patent: May 30, 2006

(54) METHOD FOR VALIDATING OPERATION OF A FIBRE LINK

(75) Inventor: Daniel A. Riedl, Andover, KS (US)

(73) Assignee: LSI Logic Corporation, Milpitas, CA (US)

( * ) Notice: Subject to any disclaimer, the term of this patent is extended or adjusted under 35 U.S.C. 154(b) by 530 days.

(21) Appl. No.: 10/205,265

(22) Filed: Jul. 25, 2002

(65) Prior Publication Data
US 2004/0019833 A1 Jan. 29, 2004

(51) Int. Cl.
G06F 11/00 (2006.01)

(52) U.S. Cl. ............... 714/43; 370/222; 370/241; 398/13; 398/59; 714/717

(58) Field of Classification Search ............ 714/42, 714/43, 717, 715; 370/241, 222; 379/1.04; 398/13, 20, 21, 59, 166
See application file for complete search history.

(56) References Cited

U.S. PATENT DOCUMENTS

| | | | | |
|---|---|---|---|---|
| 5,978,379 A * | 11/1999 | Chan et al. | ............ | 370/403 |
| 6,138,161 A * | 10/2000 | Reynolds et al. | ............ | 709/227 |
| 6,289,002 B1 * | 9/2001 | Henson et al. | ............ | 370/222 |
| 6,430,714 B1 * | 8/2002 | McAdam et al. | ............ | 714/704 |
| 6,438,285 B1 * | 8/2002 | DeCusatis et al. | ............ | 385/24 |
| 6,609,165 B1 * | 8/2003 | Frazier | ............ | 710/36 |
| 6,748,510 B1 * | 6/2004 | Coatney | ............ | 711/170 |
| 6,915,429 B1 * | 7/2005 | Allen et al. | ............ | 713/170 |
| 6,917,763 B1 * | 7/2005 | Au et al. | ............ | 398/166 |
| 2002/0002440 A1 * | 1/2002 | Sakai | ............ | 702/35 |
| 2002/0010881 A1 * | 1/2002 | White | ............ | 714/44 |
| 2002/0067738 A1 * | 6/2002 | Su et al. | ............ | 370/452 |
| 2002/0089713 A1 * | 7/2002 | Schwandner et al. | ............ | 359/110 |
| 2002/0152338 A1 * | 10/2002 | Elliott et al. | ............ | 710/34 |
| 2003/0056153 A1 * | 3/2003 | Beer et al. | ............ | 714/43 |
| 2003/0212785 A1 * | 11/2003 | Jibbe | ............ | 709/224 |

* cited by examiner

Primary Examiner—Scott Baderman
Assistant Examiner—Paul F. Contino
(74) Attorney, Agent, or Firm—Suiter West Swantz PC LLC

(57) ABSTRACT

A method for validating operation of a fiber link when the fiber link is initialized includes the steps of entering a trial link up state upon receiving a command to initialize the fiber link so that normal commands to other devices within the fiber channel loop are not resumed, and thereafter entering a final link up state and resuming normal commands to other devices within the fiber channel loop. In exemplary embodiments, the method may be implemented by devices within a system such as a disk array system of a storage area network (SAN), or the like.

22 Claims, 3 Drawing Sheets

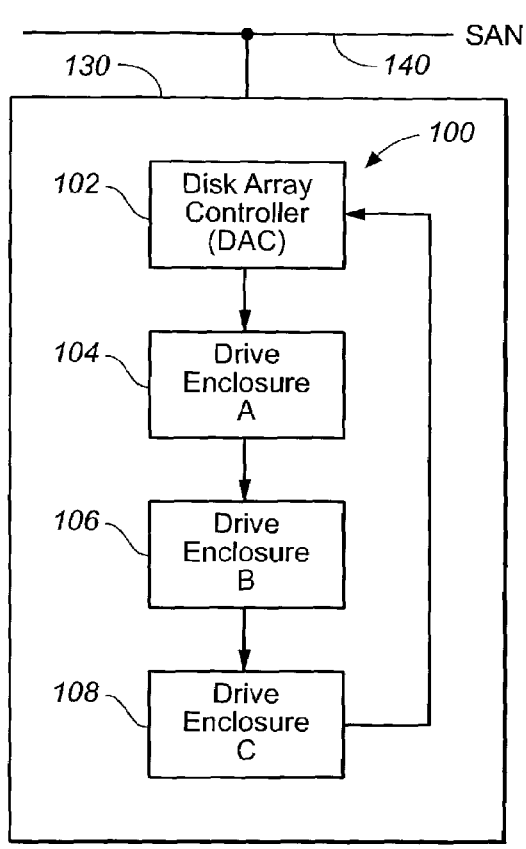
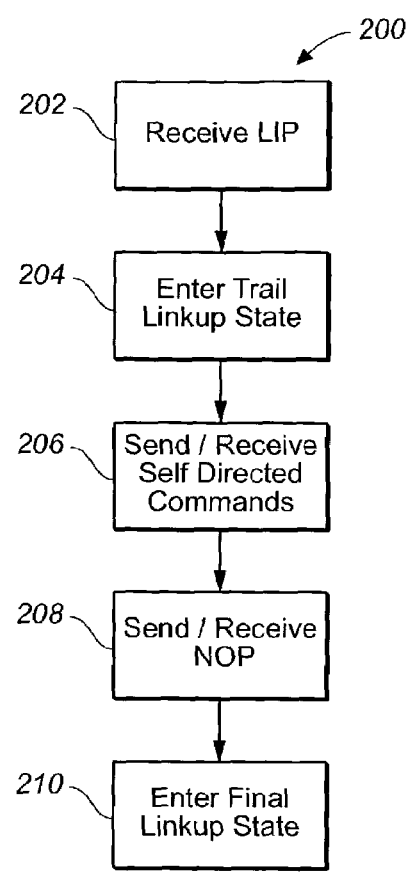
FIG._1
FIG._4

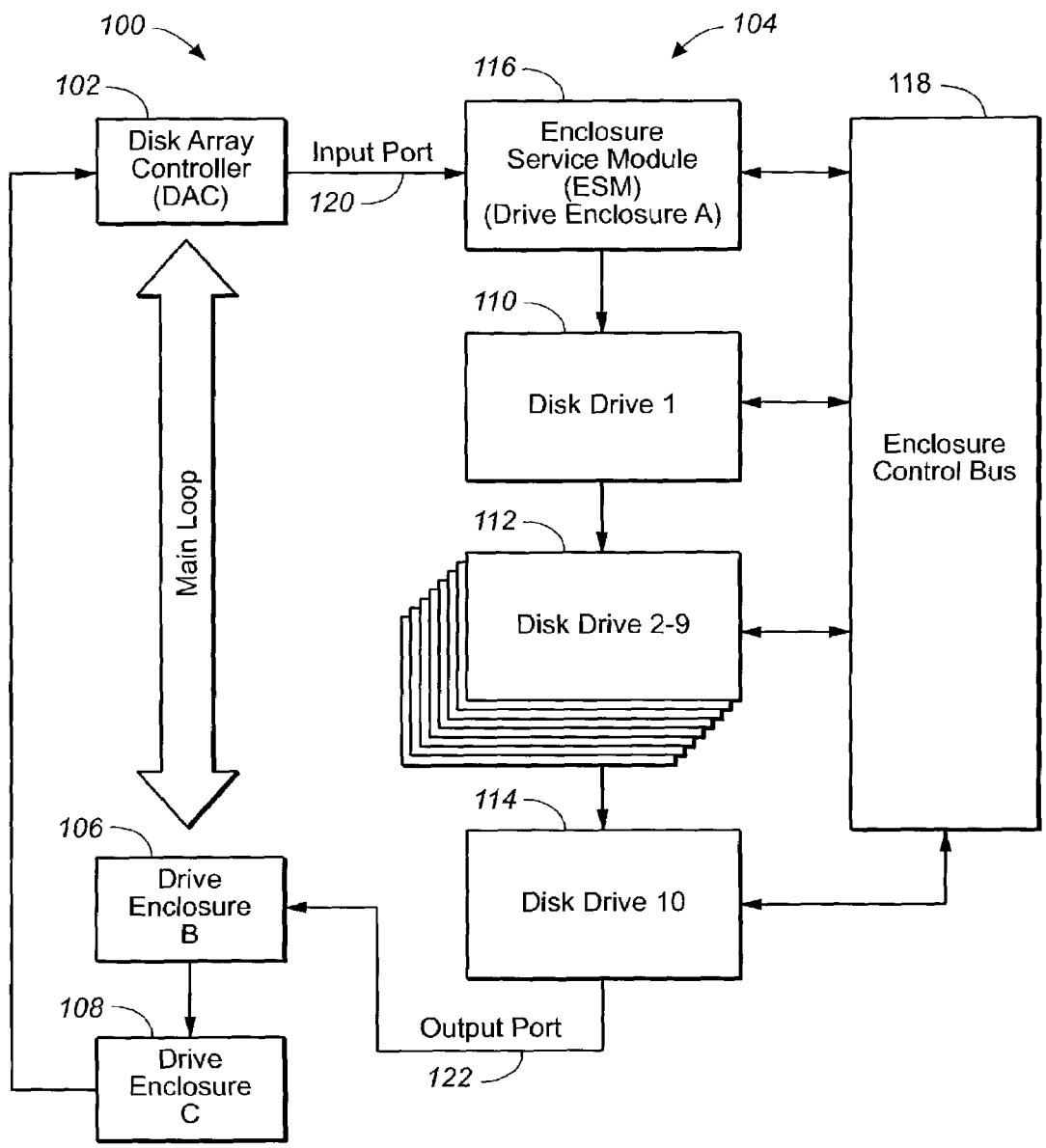
FIG._2

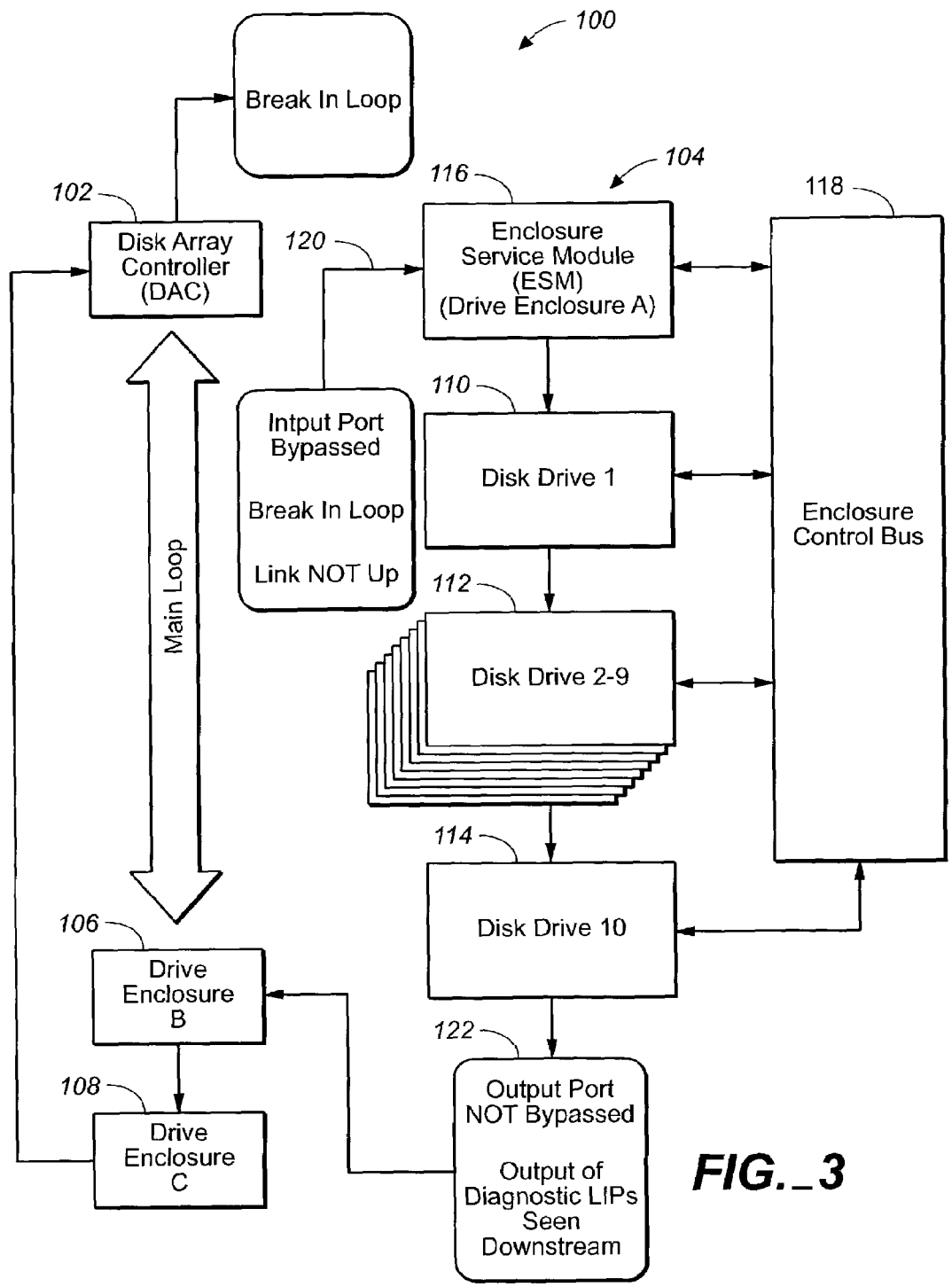
FIG._3 form: US 7,055,068 B2

METHOD FOR VALIDATING OPERATION OF A FIBRE LINK

FIELD OF THE INVENTION

The present invention generally relates to disk arrays utilized in Fibre Channel Storage Area Networks (SANs), or the like, and particularly to a method for validating operation of a fibre channel loop or link within such disk arrays.

BACKGROUND OF THE INVENTION

Fibre channel disk arrays employed by Storage Area Networks (SANs), and the like, typically comprise multiple drive-side fibre channel loops each having a plurality of devices (e.g., up to 127 devices per loop). In typical implementations, each fibre channel loop includes two disk array controllers and multiple drive enclosures, each having a plurality of drives. Each drive enclosure may further include an Enclosure Service Module (ESM) within, which monitors environmental conditions within the enclosure and attempts to ensure that individual drives within the enclosure do not cause the entire loop to become non-functional.

Normally, a fibre channel loop must be initialized when a new device enters the loop or when an error condition is detected on the loop. When the fibre channel loop (also referred to as "link") goes down to reinitialize for some reason, it normally completes initialization within 15–30 milliseconds. If the link fails to complete reinitialization within 3–5 seconds, the ESMs bypass their "input" external ports and perform diagnostics to determine if all the drives within the enclosure are functioning properly. This diagnostic process is accomplished by bypassing all the drives and then issuing a Loop Initialization Primitive (LIP), which is the command needed to begin initialization. However, the ESMs do not bypass their "output" external ports. Thus, when the ESMs are performing bypassing and LIPing operations, other devices on the loop see the LIP completions, and can falsely determine that the entire link is up when it is not.

When the disk array controller detects that the link is up (i.e., a "link up"), it attempts to resume processing of commands to the devices on the loop. However, if the link is not truly "up", these commands will fail to complete. When these commands fail to complete, the disk array controller typically seeks to restore operation of the fibre link by again attempting to initialize the link again via a LIP command. However, this approach is normally not successful since it has a tendency to put the link into a perpetual LIP condition from which it may not recover without manual intervention from an operator.

Consequently, it would be desirable to provide a method for validating operation of a fibre link of such disk arrays (i.e., for validating if the link is truly up) so that the link is not put into a perpetual LIP condition when initialized.

SUMMARY OF THE INVENTION

Accordingly, the present invention is directed to a method for validating operation of a fibre link when the fibre link is initialized. In exemplary embodiments, the method includes the steps of entering a trial link up state upon receiving a command to initialize the fibre link so that normal commands to other devices within the fibre channel loop are not resumed, and thereafter entering a final link up state and resuming normal commands to other devices within the fibre channel loop. In exemplary embodiments, the method may be implemented by devices within a system such as a disk array system of a storage area network (SAN), or the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a block diagram illustrating an exemplary fibre channel loop in accordance with the present invention;

FIG. 2 is a block diagram illustrating the fibre channel loop shown in FIG. 1 during normal operation;

FIG. 3 is a block diagram illustrating the fibre channel loop shown in FIGS. 1 and 2 wherein a fibre link is down and a drive enclosure within the fibre channel loop is performing diagnostics; and FIG. 4 is a flow diagram illustrating an exemplary method for validating operation of a fibre link, such as the fibre link illustrated in FIGS. 1 through 3.

DETAILED DESCRIPTION OF THE INVENTION

Reference will now be made in detail to the presently preferred embodiments of the invention, examples of which are illustrated in the accompanying drawings.

Referring generally now to FIGS. 1 through 3, an exemplary fibre channel loop in accordance with the present invention is described. Fibre channel loop or fibre link 100 includes a disk array controller (DAC) 102 and multiple drive enclosures (three drive enclosures 104–108 are shown), each having a plurality of fibre channel drives (ten drives 110–114 are shown). Each drive enclosure 104–108 may further include an Enclosure Service Module (ESM) 116, which monitors environmental conditions within the enclosure 104–108 via the enclosure control bus 118 and attempts to ensure that individual drives 110–114 within the enclosure 104–108 do not cause the entire loop 100 to become non-functional.

FIG. 2 provides an expanded views of the first drive enclosure 104 during normal operation (i.e., when the fibre link 100 is up). As shown in FIG. 2, no ports within fibre link 100 (e.g., input and output ports 120–122) are bypassed. Consequently, self-directed frames or commands issued by disk array controller 102 will succeed.

FIG. 3 depicts the fibre link 100 shown in FIGS. 1 and 2, wherein the fibre link 100 is down because the first drive enclosure 104 is bypassing its input port 120 but not bypassing its output port 122. When disk array controller 102 detects that the link us up (i.e., a "link up"), it attempts to resume processing of commands to the devices 104–116 on the loop. However, if the link is not truly "up", these commands will fail to complete. In the past, when commands issued by the disk array controller failed to complete, the disk array controller typically sought to restore operation of the fibre link by again attempting to initialize the link again via a LIP command. This attempt to initialize the fibre link tended to put the link into a perpetual LIP condition, where many devices on the loop are initiating LIP commands and these LIP commands fail to complete properly due to Enclosure Service Modules (ESMs) leaving and rejoining the main loop to perform diagnostics.

The present invention provides a method for validating operation of a fibre link when the fibre link is initialized. In accordance with this method, two link states: "trial link up" and "final link up" are introduced. When a device 102–116 of fibre channel loop 100 receives a LIP completion (LILP) frame (e.g., disk array controller 102), the device (e.g., disk array controller 102) first enters the trial link up state. Thereafter, the device (e.g., disk array controller 102) enters a final link up state. Preferably, normal commands to other devices (e.g., drive enclosures 106 and 108) within fibre channel loop 100 are not resumed until the device enters the final link up state. In order to enter the final link up state, the device sends a "no operation" (NOP) frame to itself via fibre channel loop 100. If the device receives its own NOP, it can safely assume that the fibre link 100 is truly up, and can enter the final link up state. Normal commands to the other devices on the loop 100 may then be resumed.

The device may also employ self-directed commands for diagnostics to ensure that the link is truly up and available for commands to be sent. While in the trial link up state, the device can send, in addition to the NOP, a command such as a read command, a write command, or the like to itself, allowing the device to determine that the loop is not only operational (i.e., the link is "up") but is also stable.

Referring now to FIG. 4, an exemplary method for validating operation of a fibre link, such as the fibre link illustrated in FIGS. 1 through 3 is described. In the exemplary embodiment shown, the method 200 is initiated, at step 202, when a command to initialize the fibre link is received by a device within the fibre channel loop. The device then enters a trial link up state, at step 204, so that normal commands to other devices within the fibre channel loop are not resumed. In exemplary embodiments, the command to initialize the fibre link comprises a Loop Initialization Primitive (LIP) including a Loop Initialization Primitive completion frame (LILP). While in the trial link up state, the device may send and receive one or more self-directed commands via the fibre link for verifying that the link is stable, at step 206. In exemplary embodiments, these self-directed commands may include read commands, a write commands, or the like. To enter the final link up state, the device sends a no operation frame (NOP) to itself, while in the trial linkup state, at step 208. When the device receives the no operation frame (NOP), the device enters the final linkup state, at step 210, and resumes normal commands to other devices within the fibre channel loop.

The present invention allows the fibre link 100 (FIGS. 1, 2 and 3) to become operable or "come up" without excessive re-initializations (e.g., via LIP commands). Thus, employing the present invention it is typically unnecessary for an operator to manually power-cycle all devices on the fibre channel loop 100 in order to complete re-initialization of the fibre link. Preferably, the present invention may employed by any topology where elements of the whole group can be segmented, which provokes other elements not within that segment to assume that the whole group is functioning properly, and take actions based upon that assumption. For example, in embodiments of the invention illustrated herein, fibre channel loop 100 comprises a loop of a disk array system 130 employed by a storage area network 140, or the like.

In exemplary embodiments, the methods disclosed may be implemented as sets of instructions (e.g., software or firmware) readable by a device within the fibre channel loop 100 (FIGS. 1, 2 and 3). Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for validating operation of a fibre link within a fibre channel loop, comprising:

receiving a Loop Initialization Primitive (LIP) to initialize the fibre link;

entering a trial link up state upon receiving the Loop Initialization Primitive (LIP) so that normal commands to other devices within the fibre channel loop are not resumed; and thereafter entering a final link up state and resuming normal commands to other devices within the fibre channel loop, wherein a Loop Initialization Primitive (LIP) command is not sent by any device within the fibre channel loop during the trial link up state.

2. The method as claimed in claim 1 wherein the Loop Initialization Primitive (LIP) includes a Loop Initialization Primitive completion frame (LILP).

3. The method as claimed in claim 1, further comprising sending a no operation frame (NOP) while in the trial linkup state, and receiving the no operation frame (NOP) whereupon the final linkup state is entered upon receiving the no operation frame (NOP).

4. The method as claimed in claim 1, further comprising sending a self-directed command while in the trial linkup state and receiving the self-directed command for verifying that the fibre link is stable.

5. The method as claimed in claim 4, wherein the self-directed command comprises at least one of a read command and a write command.

6. A system capable of validating operation of a fibre link of the system, comprising:

means for receiving a command to initialize the fibre link, the command to initialize the fibre link comprising a Loop Initialization Primitive (LIP);

means for entering a trial link up state upon receiving a command to initialize the fibre link so that normal commands to other devices within a fibre channel loop are not resumed; and means for thereafter entering a final link up state and resuming normal commands to other devices within the fibre channel loop, wherein a Loop Initialization Primitive (LIP) command is not sent by any device within the fibre channel loop during the trial link up state.

7. The system as claimed in claim 6, wherein the Loop Initialization Primitive (LIP) includes a Loop Initialization Primitive completion frame (LILP).

8. The system as claimed in claim 6, further comprising means for sending a no operation frame (NOP) while in the trial linkup state, and receiving the no operation frame (NOP) whereupon the final linkup state is entered upon receiving the no operation frame (NOP).

9. The system as claimed in claim 6, further comprising means for sending a self-directed command while in the trial linkup state and receiving the self-directed command for verifying that the fibre link is stable.

10. The system as claimed in claim 9, wherein the self-directed command comprises at least one of a read command and a write command.

11. A disk array system, comprising:
a disk array controller for controlling devices within the disk array system; and
a device within the disk array system, the device being coupled to the disk array controller via a fibre channel loop,
wherein at least one of the disk array controller and the device is capable of validating operation of a fibre link within the fibre channel loop by entering a trial link up state upon receiving a command to initialize the fibre link so that normal commands to other devices within the fibre channel loop are not resumed and thereafter entering a final link up state and resuming normal commands to other devices within the fibre channel loop,
wherein a Loop Initialization Primitive (LIP) command is not sent by any device within the fibre channel loop during the trial link up state, and
wherein at least one of the disk array controller and the device sends a no operation frame (NOP) to itself while in the trial linkup state and enters the final linkup state upon receiving the no operation frame (NOP).

12. The disk array system as claimed in claim 11, wherein the disk array controller provided a command to initialize the fibre link to the device.

13. The disk array system as claimed in claim 12, wherein the command to initialize the fibre link comprises a Loop Initialization Primitive (LIP).

14. The disk array system as claimed in claim 13, wherein the Loop Initialization Primitive (LIP) includes a Loop Initialization Primitive completion frame (LILP).

15. The disk array system as claimed in claim 11, wherein at least one of the disk array controller and the device is capable of sending and receiving a self-directed command while in the trial linkup state for verifying that the fibre link is stable.

16. The disk array system as claimed in claim 15, wherein the self-directed command comprises at least one of a read command and a write command.

17. A storage area network, comprising:
a disk array controller for controlling devices within a disk array system; and
a device within the disk array system, the device being coupled to the disk array controller via a fibre link,
wherein at least one of the disk array controller and the device is capable of validating operation of a fibre link by entering a trial link up state upon receiving a command to initialize the fibre link so that normal commands to other devices within a fibre channel loop are not resumed and thereafter entering a final link up state and resuming normal commands to other devices within the fibre channel loop,
wherein a Loop Initialization Primitive (LIP) command is not sent by any device within the fibre channel loop during the trial link up state, and
wherein at least one of the disk array controller and the device sends a no operation frame (NOP) to itself while in the trial linkup state and enters the final linkup state upon receiving the no operation frame (NOP).

18. The storage area network as claimed in claim 17, wherein the disk array controller provides a command to initialize the fibre link to the device.

19. The storage area network as claimed in claim 18, wherein the command to initialize the fibre link comprises a Loop Initialization Primitive (LIP).

20. The storage area network as claimed in claim 19, wherein the Loop Initialization Primitive (LIP) includes a Loop Initialization Primitive completion frame (LILP).

21. The storage area network as claimed in claim 17, wherein at least one of the disk array controller and the device is capable of sending and receiving a self-directed command while in the trial linkup state for verifying that the fibre link is stable.

22. The storage area network as claimed in claim 17, wherein the self-directed command comprises at least one of a read command and a write command.

* * * * *